(12) United States Patent
Christensen

(10) Patent No.: US 8,450,676 B2
(45) Date of Patent: May 28, 2013

(54) OPTICAL RECEIVER

(75) Inventor: Kenn Christensen, Roskilde (DK)

(73) Assignee: Iptronics A/S, Roskilde (DK)

( * ) Notice: Subject to any disclaimer, the term of this patent is extended or adjusted under 35 U.S.C. 154(b) by 732 days.

(21) Appl. No.: 12/636,720

(22) Filed: Dec. 12, 2009

(65) Prior Publication Data

US 2011/0139960 A1 Jun. 16, 2011

(51) Int. Cl.
*G01J 1/44* (2006.01)
*H03F 3/08* (2006.01)
*H03K 4/06* (2006.01)
*H04N 3/14* (2006.01)

(52) U.S. Cl.
USPC .................. 250/214 R; 250/214 A; 327/132

(58) Field of Classification Search
USPC ............... 250/214.1, 214 R, 214 A, 214 LA, 250/214 AL, 214 AG, 214 L, 214 LS, 208.1; 348/300, 301, 307–310; 398/24, 37, 38, 153, 398/160, 202, 207; 327/51–54, 66, 89, 96, 327/132
See application file for complete search history.

(56) References Cited

U.S. PATENT DOCUMENTS

| | | | |
|---|---|---|---|
| 4,085,411 A | 4/1978 | Genesi | |
| 5,734,300 A | 3/1998 | Yoder | |
| 6,906,325 B2 * | 6/2005 | Quek | 250/338.1 |
| 7,265,333 B2 * | 9/2007 | Ichino et al. | 250/214 R |
| 2009/0202259 A1 | 8/2009 | Tourette | |

* cited by examiner

*Primary Examiner* — Georgia Y Epps
*Assistant Examiner* — Don Williams
(74) *Attorney, Agent, or Firm* — Buchanan Ingersoll & Rooney PC

(57) ABSTRACT

An optical receiver suitable for connecting to a photodiode generating a photocurrent with a sensing resistor and a diode circuit in parallel with the sensing resistor to limit the voltage across the sensing resistor. The diode circuit allows for a larger resistor providing greater sensitivity without risking violating the necessary headroom available to the photodiode.

17 Claims, 8 Drawing Sheets

OPTICAL RECEIVER

TECHNICAL FIELD

The present invention relates to the field of optical receivers in particular integrated optical receivers.

BACKGROUND ART

In the art of optical communication the optical receiver often includes a function to provide an RSSI (Received Signal Strength Indication) signal and/or so-called LOS (Loss Of Signal) indicators or Squelch. The RSSI measurement generally provides a measure of the received DC signal which may be beneficial to allow active alignment between an optical fiber and the photodiode and/or to monitor the performance of the transmitter at the other end. The LOS (and/or Squelch) indicator may for example be used to indicate if the transmitter at the other end is present and/or whether the transmitter at the other end has become worn so that failure is eminent or already has occurred. In the optical receiver arranged to detect the current from a photodiode, the circuit detects an average of the photocurrent generated in the photodiode by inserting a resistor in a bias line to the photodiode and detecting voltage across the resistor caused by the photocurrent. One challenge is that the photocurrent may have a large dynamic range. For low current the voltage across the resistor may be difficult to detect accurate and for large current the headroom required by the photodiode may be violated. Accordingly, there is a need to provide reliable measurements of the photocurrent for high and low values of the photocurrent.

SUMMARY

The present invention relates to an optical receiver circuit suitable for connecting to a photodiode generating a photocurrent, a positive supply node and two or more current paths current paths wherein
  a. a first current path is connected between said positive supply node and said photodiode, said first current path comprises a first sensing resistor
  b. a first diode circuit is connected in parallel across said first sensing resistor so as to limit the voltage across the first sensing resistor,
  c. a second current path is connected between said positive supply node and a current sensing circuit, and
  d. a current mirror circuit is arranged to mirror current from said first diode circuit to said second current path.

In this way a relatively large sensing resistor may be used while preserving a wide measurement range of DC photocurrents. In one embodiment the sensing resistor is larger than 100Ω, such as larger than 250Ω, such as larger than 500Ω, such as larger than 750Ω, such as larger than 1 kΩ, such as larger than 1.25 kΩ, such as larger than 1.5 kΩ, such as larger than 1.75 kΩ, such as larger than 2 kΩ, such as larger than 3 kΩ, such as larger than 4 kΩ, such as larger than 5 kΩ, such as larger than 10 kΩ, such as larger than 25 kΩ, such as larger than 50 kΩ, such as larger than 75 kΩ, such as larger than 100 kΩ, such as larger than 500 kΩ. Using a relatively large sensing resistor increases the sensitivity of the current measurement. For currents sufficient to provide a voltage across the sensing resistor that violates the required headroom for the photodiode, the diode circuit may clamp this voltage by bypassing the sensing resistor. In order to allow a measurement of this current the current mirror circuit mirrors this current to a second current path.

The term photocurrent is in the present document taken to mean the DC component of the photocurrent unless otherwise clear. The signal, also referred to as the AC signal, refers to the signal content, such as the binary waveform of a digital signal. The AC signal is therefore a modulation on top of the photocurrent. In the context of the present invention the DC value may change with time substantially slower than the AC signal. Therefore DC refers to values of frequencies substantially lower than the center frequency of the bandwidth of the AC signal. In one embodiment DC refers to frequencies lower than 50% of said center frequency, such as lower than 25%, such as lower than 10%, such as lower than 5%, such as lower than 1%.

The term "current path" is generally taken to mean any path suitable for allowing current to travel between the positive supply node and the destination of the path, e.g. photodiode. In one embodiment a current path may comprise two components in parallel. In one embodiment these two components may be said to each form a current path in combination with the other components in the path between the positive supply node and the destination.

In one embodiment the invention relates to an optical receiver circuit suitable for connecting to a photodiode having a first node and a second node, said photodiode being suitable for generating a photocurrent, the optical receiver circuit further comprising a positive supply node and two or more current paths where
  a. a first current path connected between said positive supply node and a first node of said photodiode, said first current path comprising a first sensing resistor in parallel with a first diode circuit arranged to limit the voltage across the first sensing resistor,
  b. a transimpedance amplifier having an input connected to the second node of the photodiode, said input having an input impedance,
    i. a shunt circuit connected in parallel with said transimpedance amplifier comprising or connected to a current sensing circuit,
    and/or
    ii. a current sensing circuit is series with said photodiode and said transimpedance amplifier.

Similar to the first mention embodiment small currents may be measure across the first sensing resistor which may be arranged to be sufficiently large to render a sufficient sensitivity. Larger current may be measured in conjunction with the transimpedance amplifier connected to the second node of the photodiode. Transimpedance amplifiers (TIA) are in this field commonly applied in the detection of the AC signal. One function of the shunt circuit is to subtract the DC current (i.e. here referred to as the photocurrent) from the current from the photodiode. This improves the working point of the TIA. However, the shunt circuit may induce noise, so for small current the shunt circuit may in one embodiment be turned off. It is therefore beneficial to measure the current for small currents across the sensing resistor and for larger current use the current sensing circuit related to the shunt circuit.

In one embodiment the invention relates to a an optical system comprising a receiver circuit as described above. Such an optical system may in principle be any system comprising a receiver where an indicator of the average incoming light is desirable. In one embodiment the system belong to one of the system types of: an optical interconnect, an active cable, a receiver chip, and a transceiver chip. A receiver according to the invention may be beneficial for example during assembly where it may be beneficial to have an indicator of the quality of the alignment. In one embodiment on or more indicators of the photocurrent is applied during use e.g. to measure changes in power levels from the transmitter side (e.g. due to aging of the transmitting light source) or when part of a plug-able system as an indicator of the presence of a signal which would indicate that a cable is connected. The latter may for example be useful in regulation of a corresponding transmitter so that eye-safety concerns may be adhered to.

BRIEF DESCRIPTION OF DRAWINGS

The invention will be explained more fully below in connection with a preferred embodiment and with reference to the drawings in which.

The figures are schematic and may be simplified for clarity. Throughout, the same reference numerals are used for identical or corresponding parts.

Figure 1:
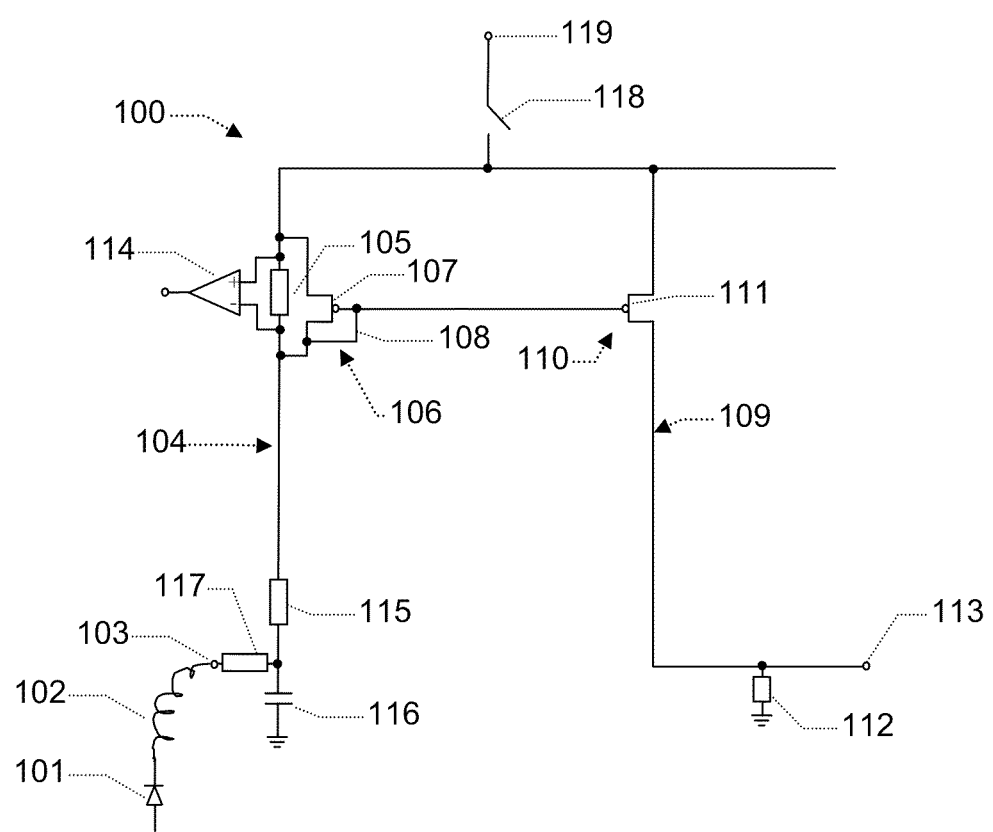
FIG. 1 shows a circuit according to an embodiment of the invention where the current through the sensing resistor and the current through the diode circuit is measured separately.

Further scope of applicability of the present invention will become apparent from the detailed description given hereinafter. However, it should be understood that the detailed description and specific examples are given by way of illustration. Furthermore, features described in regard to one embodiment will, unless otherwise clear, be combinable with features of other embodiments.

DETAILS OF THE PREFERRED EMBODIMENTS

In one embodiment the first current path is connected with a secondary current path via a voltage controller circuit arranged to impose a voltage from the first branch to the secondary current path. In principle a voltage controller circuit may be any circuit suitable for imposing a voltage in the secondary branch. In this way a voltage related to the voltage across the first sensing resistor may in one embodiment be imposed onto a node of the second current path causing a response related to the current through the first sensing resistor. In one embodiment the secondary current path comprises a second sensing resistor. In one embodiment the imposed the voltage imposed by the voltage controller is arranged to produce a current in said secondary current path, such as a current reflecting the current in the first sensing resistor. In one embodiment the voltage determines the voltage across said second sensing resistor, in another embodiment the current in the second sensing resistor is produced via one or more active components such as a transistor or amplifier.

In one embodiment the second current path is the secondary current path. In one such embodiment the mirrored current from the first diode circuit and the current reflecting the current in the first sensing resistor may be combined in the second current path. Accordingly the current sensing circuit of the second current path may be exposed to a current reflecting the combined current. In on embodiment the combined current reflects, i.e. is substantially linearly related to, the photocurrent.

In one embodiment the said first diode circuit is selected from a diode, a diode coupled transistor and an active diode circuit. A diode or diode coupled transistor will allow a simple implementation where the threshold voltage depends on the structure of the diode. However, depending on the production technique used exact production tolerances may be challenging to achieve.

An active diode circuit refers to circuit constructions where this circuit functions substantially as an active diode known in the art. An active diode may in one embodiment be less sensitive to production variations and allow the threshold voltage to be set. In one embodiment the circuit, such as the active diode circuit, comprises at least one differential amplifier having at least two inputs. In one embodiment one input of said differential amplifier is arranged to depend on the voltage across the first sensing resistor and the other input determines the threshold voltage of the diode circuit. In one embodiment this input is arranged as an external voltage input node so that the minimum voltage headroom allowable for the photodiode may be adjusted via this node. However, it may as well be set internally in the circuit. In one embodiment the circuit is arranged to that the threshold voltage may be set by programming. In one embodiment the threshold voltage is set by the circuit In one embodiment the circuit further comprises a capacitive load in parallel with the photodiode. This capacitor may function reduce noise towards the photodiode which may interfere with the AC signal and/or to remove AC components from the photocurrent toward the sensing resistor. In one embodiment the photodiode is located externally from the circuit and there therefore exists a relatively long path connecting the photodiode. In one embodiment this path comprises a bond wire. Such a relatively long path may form an inductive load which in series with said capacitive load may form resonant LC circuit.

In one embodiment the circuit further comprises one or more guard resistors in series with said photodiode, i.e. resistors arranged to the resonance of the mentioned LC circuit. In one embodiment it is preferable to have relatively small guard resistors so that their impact on the headroom available for the photodiode is relatively small. In one embodiment the guard resistor is less than 500$\Omega$, such as less than 250$\Omega$, such as less than 100$\Omega$, such as less than 50$\Omega$, such as less than 25$\Omega$, such as less than 10$\Omega$.

In one embodiment the circuit comprises three or more current paths each comprising a current sensing circuit where the circuit is arranged so that a voltage and/or a current of the first current path is substantially mirrored to said paths. In one embodiment this mirroring is arranged to occur via one or more intermediate paths such as mirroring a current from the first to a second path and from that to a third path.

In principle a current sensor circuit is any circuit or component which is arranged to provide a signal or other wise indicate the amount of current through the circuit either to an external node or to an internal function, such as squelch. In one embodiment such a current sensing circuit is selected from the group of a measurement resistor (i.e. a resistor over which the voltage drop is measurable either via external node(s) and/or via circuitry such as a differential amplifier), a LOS detector circuit, a squelch detector circuit, and a combination thereof. In the present context a measurement resistor is a resistor over which a voltage may be measured either by an internal measurement system or, via at least one node, externally. The size of the measurement resistor may be selected depending on the application. A larger resistor may provide larger sensitive where a smaller resistor will allow a larger range of currents without violating the available headroom. Naturally, the size of the measurement resistor may also depend on the mirror ratio chosen for the current mirror.

A LOS detector circuit is a circuit which is arranged to signal when the current fall below a threshold. It may further in incorporate a hysteresis function. Similarly, a squelch circuit which is arranged to signal when the current fall below a threshold but is often arranged to turn off the signal output which may otherwise hold a significant noise signal. The latter may be undesirable for components arranged to receive the signal. In the event of squelch the signal output may in one embodiment be said to one of low, high, or toggling at a rate far below the signal rate.

As discussed above one embodiment of the invention relates to embodiments where at least part of the photocurrent is determined from the current in a shunt circuit relative to a transimpedance amplifier. Furthermore, such embodiments may comprise any of the features of the embodiment discussed above. In one embodiment the current sensing circuit is formed by a measurement resistor large relative to said input impedance. In one embodiment this measurement resistor is more than a factor 2 larger than the input impedance, such as more than a factor 5, such as more than a factor 10, such as more than a factor 50, such as more than a factor 100, such as more than a factor 1000.

In one embodiment the current sensing circuit is formed at least partly by a current mirror arranged to mirror the current in the shunt circuit to a another current branch. This current branch may comprise one or more current sensing circuits. Such an embodiment may be beneficial when the effects of the above mentioned resistor, such as headroom limitations and/or noise contributions from the resistor cannot be tolerated.

As mentioned above, the shunt circuit is often only functioning for photocurrent higher than a particular value as the shunt circuit otherwise contributes with too much noise relative to the AC signal. Therefore in one embodiment the photocurrent is determined as the current in said first sensing resistor or the current in said shunt circuit depending on the magnitude of the photocurrent. The designer of the circuit may therefore choose to set the threshold voltage for the diode circuit and/or the size of the sensing resistor so that shunt circuit is activated for a lower photocurrent than the value causing the threshold voltage across the sensing resistor. In one embodiment these values are substantially matched.

DETAILED DESCRIPTION OF THE DRAWINGS

FIG. 1 shows a receiver circuit 100 according to an embodiment of the invention. The photodiode 101 is connected to a node 103 via a bond wire 102. The first current branch 104 comprises a first sensing resistor 105 and a diode circuit 106 in parallel to that. The diode circuit 106 is here shown as a diode coupled transistor 107. The transistor 107 also performs the function as one side of a current mirror formed in combination with the transistor 111 located in the second current branch 109. The second current branch further comprises a current sensing circuit in the form of measurement resistor 112 and a node 113 suitable for measuring the voltage across the measurement resistor 112. In this embodiment the voltage on the node 113 reflects the current in the diode circuit 106. In order to determine the total photocurrent the circuit 100 further comprises a measurement amplifier 114 arranged to measure the voltage across the first sensing resistor. This amplifier may be integrated with the circuit or replaced by and external measurement circuit. Finally, the circuit is shown with a switch 118 suitable for coupling and decoupling the circuit from the node 119. The node 119 is typically connected to a supply voltage often referred to as $V_{DD}$.

Figure 2:
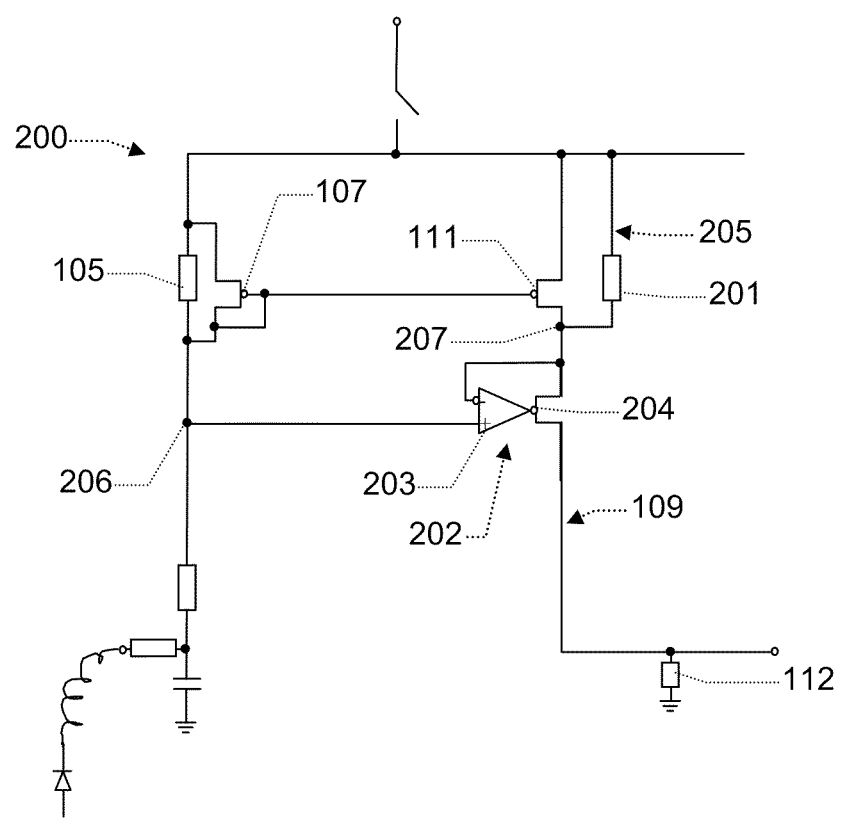
FIG. 2 shows a circuit according to an embodiment of the invention where current through the sensing resistor and the current through the diode circuit may be measured commonly in the second current branch.

FIG. 2 shows a receiver circuit 200 which is a variation of the circuit of FIG. 1. The circuit further comprises circuit 202 comprising a differential amplifier 203 and a transistor 204 arranged to impose a potential from the node 206 from the first current branch on the node 207 thus acting as a voltage controller. The circuit also comprises a second sensing resistor 201 forming a secondary current branch 205. The current from the second and secondary branches are combined in the node 207. Equivalently, the second sensing resistor may also be viewed as part of the second current branch connected in parallel with the transistor 111. Due to the corresponding potentials of the nodes 206 and 207 the current through the first sensing resistor is reflected in the second sensing resistor. Accordingly, if the transistor 111 is scaled to the transistor 107 as the second sensing resistor 201 is scaled to the first sensing resistor 105 the current through the measurement resistor 112 will reflect the photocurrent. Simultaneously, the correspondence between nodes 206 and 207 may improve the mirror characteristics of the current mirror as the transistors 107 and 111 are provided with substantially identical potentials on all ports.

Figure 3:
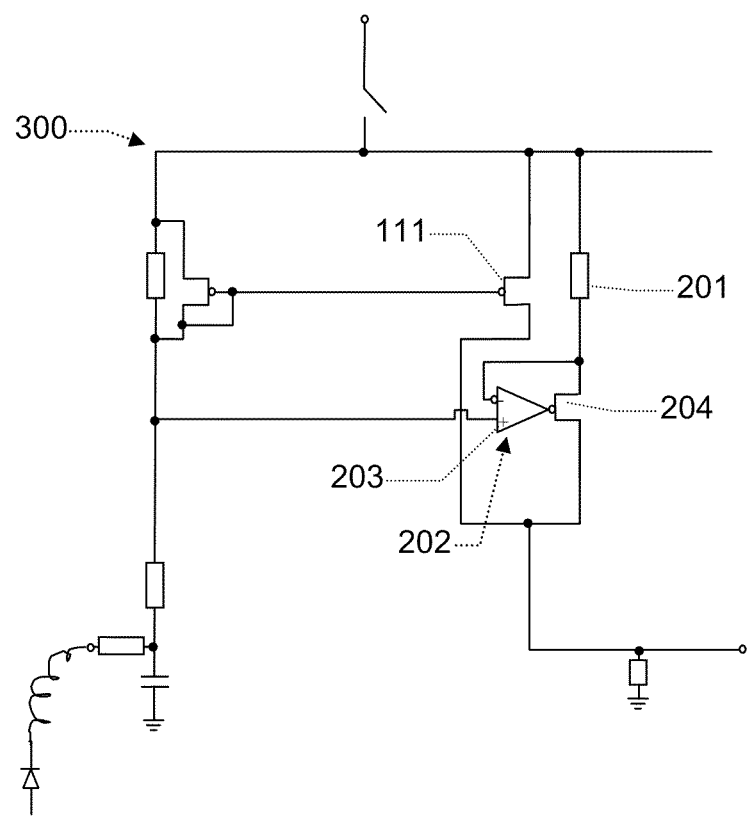
FIG. 3 shows a variation of the circuit of FIG. 2.

FIG. 3 shows a receiver circuit 300 which is a variation of the circuit of FIG. 2. Here the circuit 202 is arranged to only impose the potential on the second sensing resistor 201 as opposed to the combination of the transistor 111 and the second sensing resistor 201.

Figure 4:
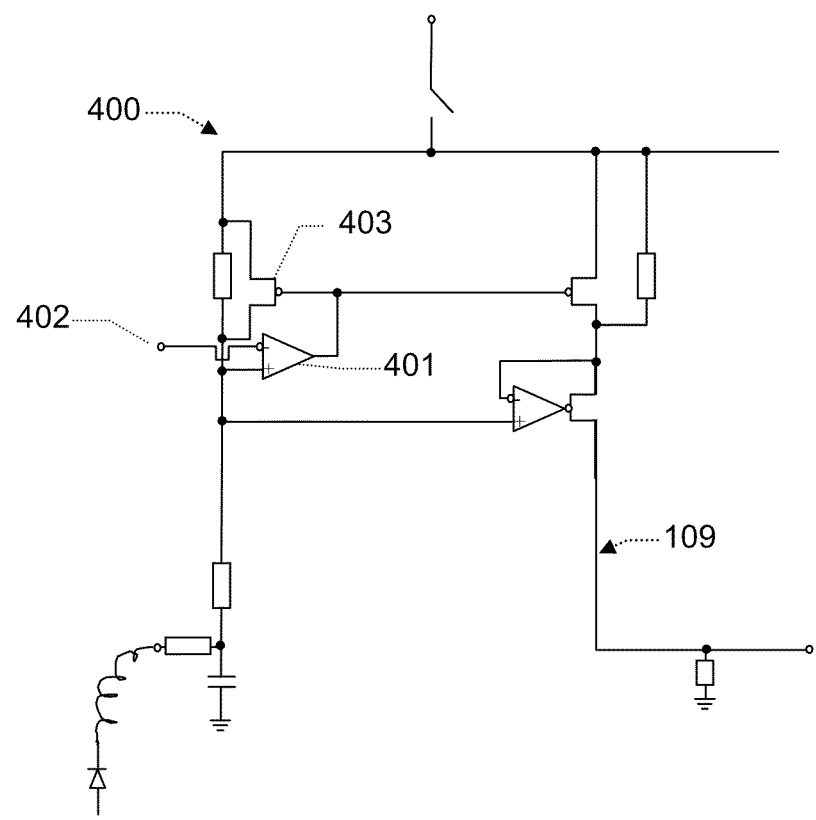
FIG. 4 shows a circuit according to an embodiment of the invention similar to that of FIG. 2 but here the diode circuit is formed by an active diode circuit.

FIG. 4 shows a receiver circuit 400 which is a variation of the circuit of FIG. 2. Here the diode circuit is formed by an active diode formed by the differential amplifier 401 and the transistor 403. The transistor 403 simultaneously forms one side of a current mirror to the second current branch 109 similarly to the transistor 107 in FIG. 2. In this embodiment the node 402 controls one input potential of the differential amplifier 401, so that the threshold voltage of the active diode may be adjusted via this node. This allows the minimum headroom available to the photodiode to be set via the node 402.

Figure 7:
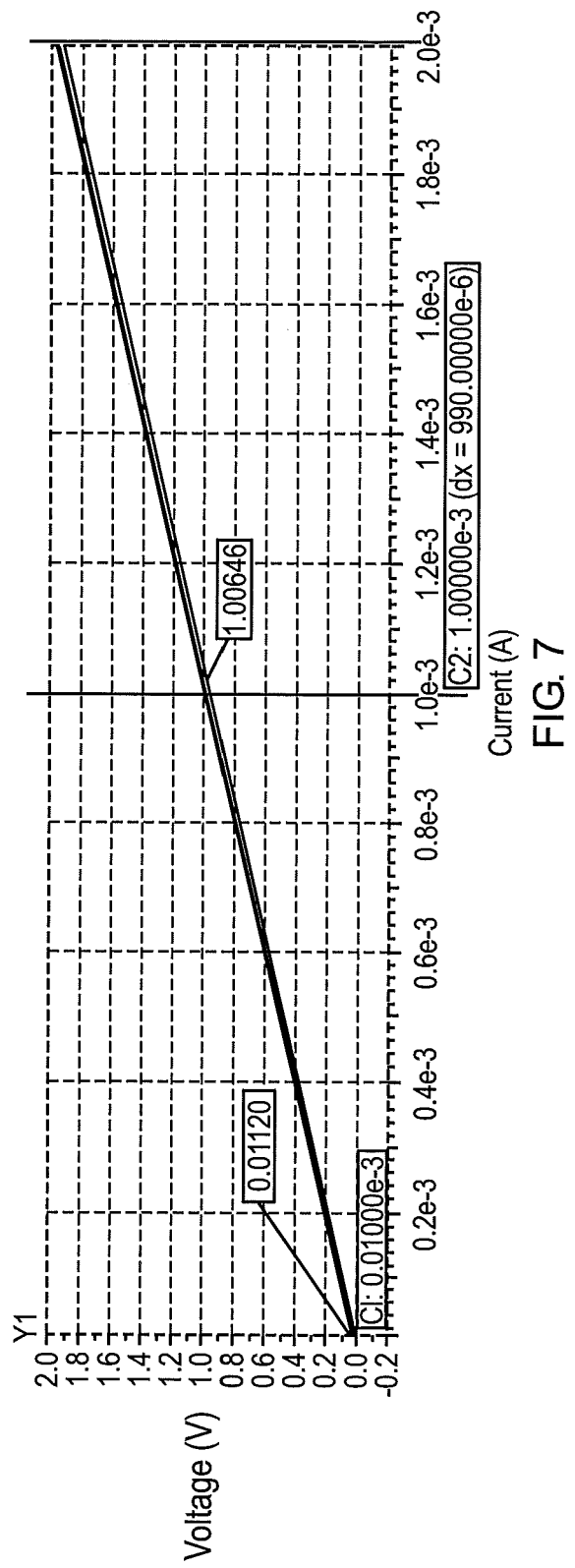
FIG. 7 shows a simulated relation between photocurrent and measured voltage in a circuit as shown in FIG. 4.
Figure 8:
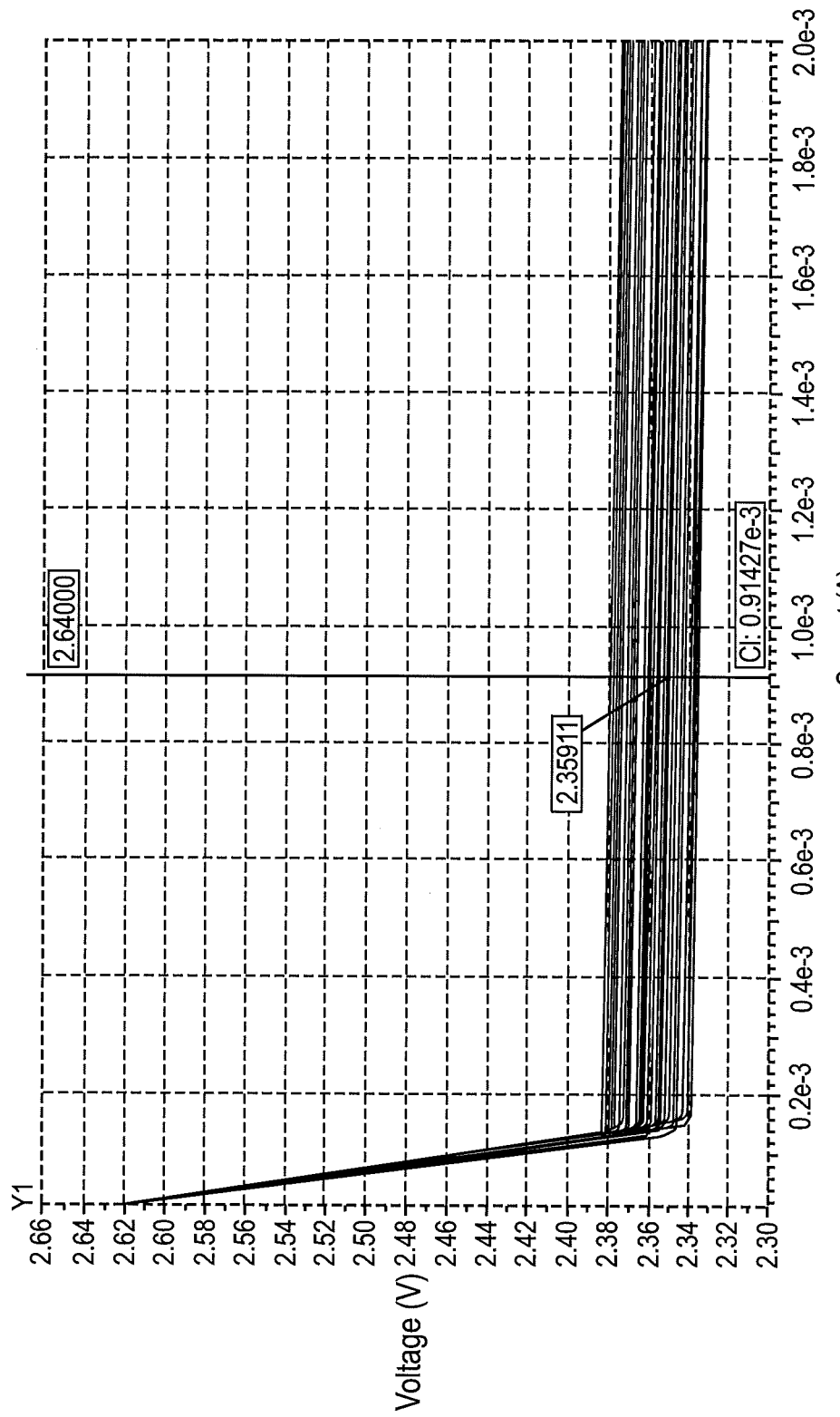
FIG. 8 shows simulated relation between photocurrent and bias voltage of the photodiode in a circuit as shown in FIG. 4.

FIG. 7 shows a simulated relation between photocurrent and measured voltage across the measurement resistor in a circuit as shown in FIG. 4. On the axes the voltage ranges from −0.2 V to 2.0 V and 0 mA to 2.0 mA. The components of the circuit were arranged to provide a transimpedance gain of 1 kΩ and a substantial linear relation is observed with a voltage of 0.0112V for 0.0 mA and 1.00646V at 1.0 mA. The circuit was simulated for likely variations of component values caused by production. This is indicated with multiple curves. At the same time the voltage at node 103 where the photodiode is connected as a function of the photocurrent was simulated. The results are shown in FIG. 8. The supply voltage is assumed to be 3.3V minus a 20% safety margin, i.e. 2.64V, and the threshold of the active diode is set so that the minimum voltage at the node 113 is 300 mV less. As it can be observed, the active diode limits the decrease in the voltage at the node 113 as the current increases to about 2.34V or more. As in FIG. 7, the multiple curves indicate performance variation due to production variations of the components.

Figure 5:
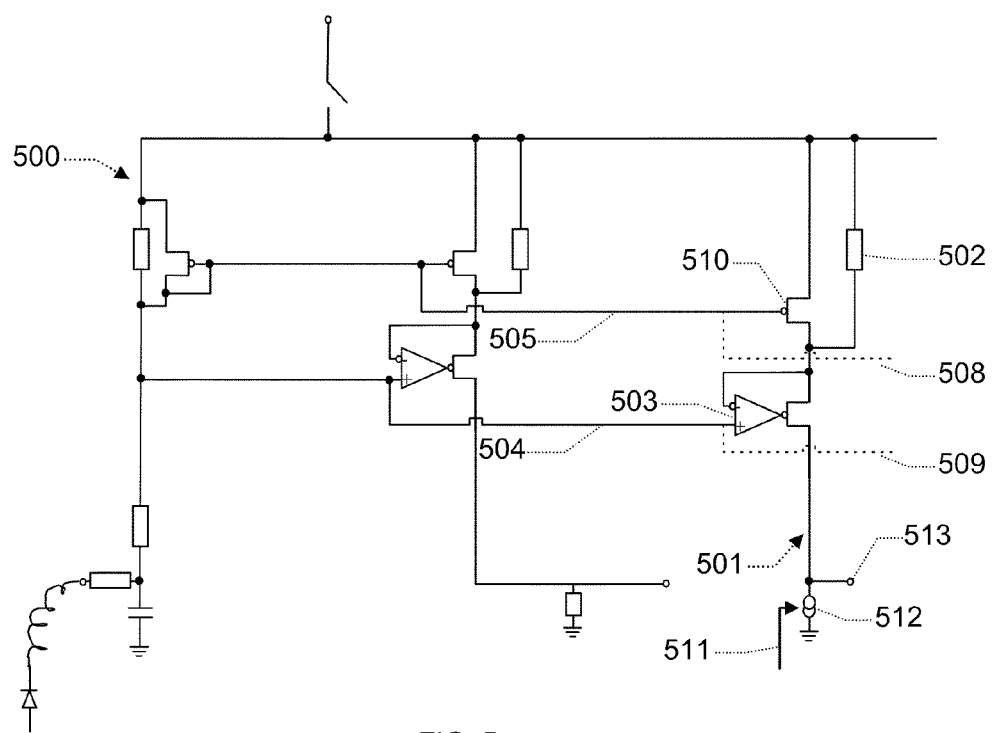
FIG. 5 shows a circuit according to an embodiment of the invention similar to that of FIG. 2 but this circuit further comprises a third current branch comprising a current sensing circuit suitable for functioning as a squelch indicator.

FIG. 5 shows a receiver circuit 500 which is a variation of the circuit of FIG. 2 where the circuit comprises a third current branch 501 comprising a LOS detector circuit formed by a node 513, a current source 512 adjustable via a regulator 511. The connections 504 and 505 function to relay the potentials from the second current branch, so that the current from the current source 512 reflects the photocurrent. In the event that the photocurrent is larger than the setting of the source 512 the voltage across the source 512 will be low. Whereas a photocurrent smaller than the setting of the source 512 will correspond to a high voltage across the current source 512. Accordingly, the node 512 may be applied to indicate when the DC current from the photodiode has dropped under a set level given by the adjustable current source 512.

Figure 6:
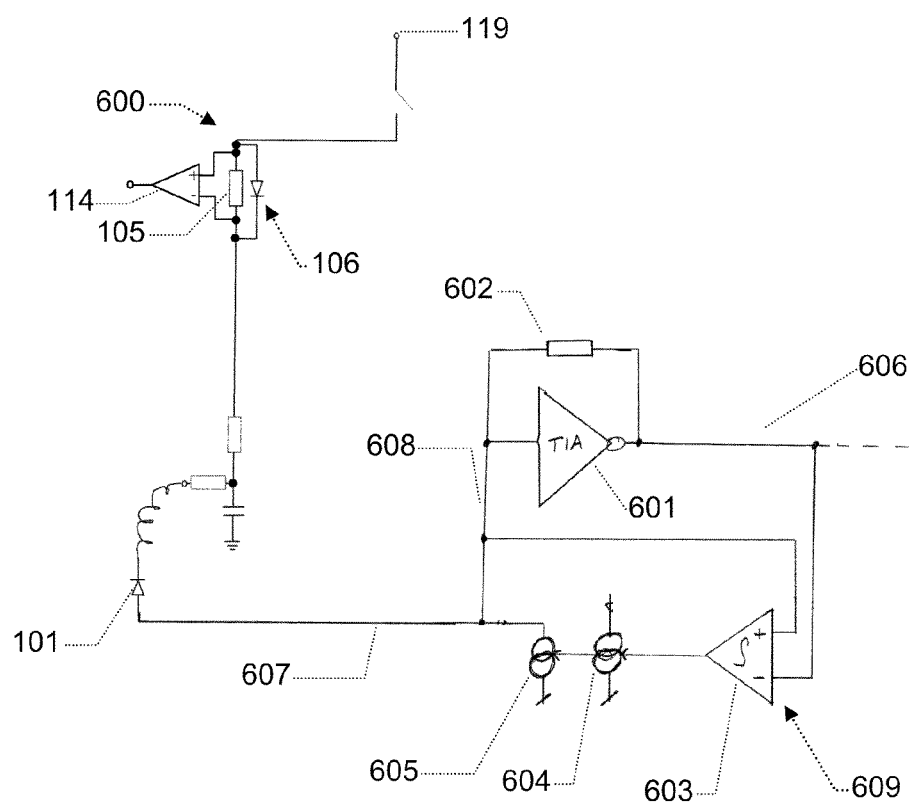
FIG. 6 shows a circuit according to an embodiment of the invention where current may be detected in relation to a TIA and a shunt circuit.

FIG. 6 shows a circuit 600 according to one embodiment of the invention. In this embodiment the photodiode is connected to the sensing resistor 105 on one side. The sensing resistor is connected in parallel with a diode circuit 106 here shown as a diode. Similar to the circuit of FIG. 1 a differential amplifier 114 is arranged to measure the potential across the sensing resistor 105. In this way small currents may be detected with an accuracy largely determined by the magnitude of the sensing resistor where the diode circuit 106 ensures that larger currents may be detected by the photodiode 101 with sufficient headroom. The other side of the photodiode is connected to a transimpedance amplifier 601 having a feedback resistor 602. The output of the amplifier 606 commonly holds the AC signal received by the photodiode, i.e. the bit stream in a binary application. The circuit further comprises a shunt circuit 609 here formed by an integrating amplifier which is arranged to adjust the magnitude current source 605 so that the potential at DC value of potential at the node 608 and 609 are substantially identical. This indicates that the DC current through the feedback resistor 602 is substantially zero, which in turns indicates that the photocurrent matches the current from the current source 605. As mentioned above the shunt circuit is often deactivated for small values of the photocurrent in order to avoid that noise from the shunt circuit affects the sensitivity of the TIA. The circuit that enables and disables the shunt circuit is not shown. In one example the TIA is designed to operate well for a photocurrent lower than a specific value above which the shunt circuit "steals" the photocurrent.

By having a second current 604 being adjusted in parallel with the current source 605, the photocurrent may be measured by inserting a current sensing circuit in series with 604 and/or mirroring the current from the source 604 to another branch comprising a current sensing circuit. Using the shunt circuit to obtain the DC current has the advantage that the shunt circuit may in one embodiment be implemented anyway in order to obtain improved operation of the TIA. In one embodiment it is advantageous that no components are inserted on the path between the photodiode and the TIA. Such components may contribute with undesired noise and other distortion of the signal. Furthermore such components may affect the headroom of the photodiode.

However, in one embodiment it may be advantageous to place a current sensing circuit on the path 607 eiter alone or in combination with a current sensing circuit related to a shunt circuit.

The current sources 604 and 605 may be related in a variety of ways. In one embodiment these current source are scaled or unscaled twins which are uncoupled except the shared regulation from the amplifier 603. In one embodiment 604 and 605 are coupled via a current mirror. In one embodiment the current from the branch on which the source 604 is located is mirrored to one or more other current branches so that two or more current sensing circuits may be applied. This is in one embodiment similar to the circuit of FIG. 5.

The invention claimed is:

1. An optical receiver circuit comprising:
   a positive supply node suitable for connecting to a photodiode generating a photocurrent;
   a first current path connected between said positive supply node and said photodiode, said first current path comprises a first sensing resistor connected between said positive supply node and said photodiode;
   a first diode circuit connected in parallel across said first sensing resistor so as to limit the voltage across the first sensing resistor;
   a second current path connected between said positive supply node and a current sensing circuit, and
   a current mirror circuit arranged to mirror current from said first diode circuit to said second current path.

2. The circuit of claim 1, where said first current path is connected to a secondary current path via a voltage controller circuit arranged to impose a voltage from the first branch to the secondary current path.

3. The circuit of claim 2, where the voltage imposed by the voltage controller circuit is arranged to produce a current in said secondary current path.

4. The circuit of claim 3, where said secondary current path comprises a second sensing resistor voltage controller circuit determines the voltage across said second sensing resistor.

5. The circuit of claim 1, where said second current path is said secondary current path.

6. The circuit of claim 1, wherein said first diode circuit is selected from a diode, a diode coupled transistor, and an active diode circuit.

7. The circuit of claim 1, wherein said first diode circuit comprises at least one differential amplifier having at least two inputs where one input of said differential amplifier is arranged to depend on the voltage across the first sensing resistor and the other input substantially determines the limit of the voltage across the first sensing resistor.

8. The circuit of claim 7, wherein one input of said differential amplifier is arranged to depend on a voltage input node.

9. The circuit of claim 1, wherein said first current path further comprises one or more guard resistors in series with the photodiode.

10. The circuit of claim 1, wherein said circuit further comprises a capacitive load in parallel with the photodiode.

11. The circuit of claim 1, where said circuit comprises three or more current paths each comprising a current sensing circuit and said circuit is arranged so that a voltage of the first current path is substantially mirrored to said paths.

12. The circuit of claim 11, wherein said voltage is mirrored via one or more intermediate current paths.

13. The circuit of claim 1, wherein said current sensing circuit is selected from the group of a measurement resistor, a LOS detector circuit, a squelch detector circuit, and a combination thereof.

14. An optical system comprising a receiver circuit according to claim 1.

15. The system of claim 14, wherein said system is a type selected from the group of an optical interconnect, an active cable, a receiver chip, and a transceiver chip.

16. The circuit of claim 1, where said circuit comprises three or more current paths each comprising a current sensing circuit and said circuit is arranged so that a current of the first current path is substantially mirrored to said paths.

17. The circuit of claim 16, wherein said current is mirrored via one or more intermediate current paths.

* * * * *